US011143281B2

(12) United States Patent
Onishi

(10) Patent No.: US 11,143,281 B2
(45) Date of Patent: Oct. 12, 2021

(54) VEHICLE AXLE DEVICE

(71) Applicant: Hitachi Construction Machinery Co., Ltd., Tokyo (JP)

(72) Inventor: Tomohiro Onishi, Kasumigaura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 16/978,819

(22) PCT Filed: Aug. 5, 2019

(86) PCT No.: PCT/JP2019/030710
§ 371 (c)(1),
(2) Date: Sep. 8, 2020

(87) PCT Pub. No.: WO2020/036088
PCT Pub. Date: Feb. 20, 2020

(65) Prior Publication Data
US 2020/0408294 A1 Dec. 31, 2020

(30) Foreign Application Priority Data
Aug. 16, 2018 (JP) .............................. JP2018-153202

(51) Int. Cl.
*F16H 48/32* (2012.01)
*F16H 48/08* (2006.01)
(Continued)

(52) U.S. Cl.
CPC ............. *F16H 48/32* (2013.01); *B60B 35/14* (2013.01); *B60K 17/16* (2013.01); *F16H 48/08* (2013.01);
(Continued)

(58) Field of Classification Search
CPC .......... F16H 48/32; F16H 48/08; F16H 48/40; F16H 48/22; F16H 2048/085;
(Continued)

(56) References Cited

U.S. PATENT DOCUMENTS 4,644,823 A * 2/1987 Mueller ............. B60K 17/3462
180/248
4,679,463 A * 7/1987 Ozaki .................... B60K 23/04
475/231
(Continued)

FOREIGN PATENT DOCUMENTS

| JP | 61-175339 A | | 8/1986 | |
|---|---|---|---|---|
| JP | S61175339 | * | 8/1986 | ............. F16H 48/08 |
| JP | 10-19108 A | | 1/1998 | |

OTHER PUBLICATIONS

JPS61175339—TERAOKA (Aug. 7, 1986)—Differential Device for Vehicle (machine translation).*
(Continued)

*Primary Examiner* — Tinh Dang
(74) *Attorney, Agent, or Firm* — Crowell & Moring LLP

(57) ABSTRACT

A differential case (23) is therein provided with a plurality of rotating discs (38) that are spline-coupled to an outer peripheral side of aright side gear (35), and a plurality of non-rotating discs (39) that are respectively arranged between the respective rotating discs (38) and are non-rotatable relative to the differential case (23) and are movable in a left-right direction. A pressure ring (43) that presses the non-rotating discs (39) toward the rotating discs (38) is disposed between a right retainer (41) positioned in the right side gear (35)-side and the non-rotating disc (39). The right retainer (41) is therein provided with a piston accommodating part (41D) in a position facing the pressure ring (43) in the left-right direction. The piston accommodating part (41D) is therein provided with a piston (46) that is displaced
(Continued)

by hydraulic pressure to press the non-rotating discs (39) against the rotating discs (38) through the pressure ring (43).

3 Claims, 12 Drawing Sheets

(51) Int. Cl.
  *F16H 48/22*  (2006.01)
  *F16H 48/40*  (2012.01)
  *F16H 57/037* (2012.01)
  *B60K 17/16*  (2006.01)
  *B60B 35/14*  (2006.01)
  *E02F 9/02*   (2006.01)
  *F16H 57/02*  (2012.01)
(52) U.S. Cl.
  CPC .............. *F16H 48/22* (2013.01); *F16H 48/40* (2013.01); *F16H 57/037* (2013.01); *E02F 9/02* (2013.01); *F16H 2057/02052* (2013.01)
(58) Field of Classification Search
  CPC ......... F16H 57/037; F16H 2057/02052; F16H 48/30; F16H 48/38; B60K 17/16; B60B 35/14; E02F 9/02
  See application file for complete search history.

(56) References Cited

U.S. PATENT DOCUMENTS

| | | | | |
|---|---|---|---|---|
| 4,811,628 A * | 3/1989 | Winkam | ................ | F16H 48/08 475/86 |
| 4,867,010 A * | 9/1989 | Stettler, Jr. | .............. | F16H 48/08 475/86 |
| 4,934,213 A * | 6/1990 | Niizawa | .................. | F16H 48/08 475/239 |
| 4,966,250 A * | 10/1990 | Imasaki | ............. | B60K 23/0808 180/197 |
| 5,279,401 A * | 1/1994 | Stall | ........................ | F16H 48/08 192/52.4 |
| 5,310,388 A * | 5/1994 | Okcuoglu | .............. | B60K 17/20 475/88 |
| 5,536,215 A * | 7/1996 | Shaffer | .................. | B60K 17/20 475/88 |
| 6,120,408 A * | 9/2000 | Yates, III | ................ | F16H 48/08 192/82 T |
| 6,561,939 B1 * | 5/2003 | Knapke | ................... | F16D 28/00 192/84.6 |
| 6,620,072 B1 | 9/2003 | Salg | | |
| 2012/0316024 A1 * | 12/2012 | Weber | ................ | F16H 57/0483 475/160 |

OTHER PUBLICATIONS

International Search Report (PCT/ISA/210) issued in PCT Application No. PCT/JP2019/030710 dated Oct. 21, 2019 with English translation (two (2) pages).

Japanese-language Written Opinion (PCT/ISA/237) issued in PCT Application No. PCT/JP2019/030710 dated Oct. 21, 2019 (four (4) pages).

* cited by examiner

VEHICLE AXLE DEVICE

TECHNICAL FIELD

The present invention relates to a vehicle axle device to be used suitably for a wheel type construction machine such as a wheel loader and a wheel type hydraulic excavator, for example.

BACKGROUND ART

In general, for example, there is known a wheel loader as a representative example of a wheel type construction machine. In this wheel loader, a front vehicle body is coupled to the front side of a rear vehicle body to be capable of swinging in a left-right direction, and a working mechanism composed of an arm, a bucket and the like is mounted to the front vehicle body. On the other hand, an engine as a drive source, a torque converter, a transmission, a hydraulic pump and the like are mounted on the rear vehicle body of the wheel loader. Power of the engine is transmitted to the transmission through the torque converter.

Axle devices are mounted on the front vehicle body and the rear vehicle body respectively to drive and rotate left and right wheels. This axle device is connected via a propeller shaft to an output shaft of the transmission to transmit a rotational force of the engine to the left and right wheels. Here, the axle device is provided with left and right axle shafts, a hollow differential body, and a differential mechanism. The differential body is disposed between left and right axle tubes accommodating therein the left and right axle shafts. The differential mechanism is disposed in the differential body to distribute the rotational force of the engine to the left and right wheels. Mount parts are disposed respectively on left and right axle tubes in a front axle device. The front axle device is attached via the left and right mount parts to the front vehicle body. On the other hand, a rear axle device is attached via an axle support to the rear vehicle body.

Incidentally, when a wheel loader travels in the sand, in the mud or the like, for example, in a case where a ground road surface state of the left wheel differs from that of the right wheel, one of the left and right wheels possibly runs idle by the differential mechanism. For this reason, there is known a limited slip differential mechanism. The limited slip differential mechanism temporarily locks the differential mechanism in response to a condition. As a result, the rotational force of the engine is transmitted to the left and right wheels without one thereof running idle.

The limited slip differential mechanism is provided with a differential case that rotates with an engine, and pinion gears, left and right side gears, left and right transmission shafts, non-rotating discs, and rotating discs, which are arranged in the differential case. The left and right side gears are engaged with the pinion gears in the differential case. The left and right transmission shafts are connected to the left and right side gears to transmit rotation of the differential case to the axle shafts. The non-rotating disc is disposed in the differential case in a non-rotating state relative to the differential case. The rotating disc is disposed in the differential case in an axial overlapping state with the non-rotating disc to rotate together with the left and right side gears. In addition, the limited slip differential mechanism of a hydraulic clutch type is provided with a piston that axially moves by supply of a hydraulic force. This piston presses the non-rotating disc to be made in frictional contact with the rotating disc. Thereby, when a torque difference between the left and right axle shafts is below a torque capacity of a clutch, the differential mechanism becomes in a lock state (a differential lock state). As a result, the left and right side gears rotate together with the differential case to cause the left and right transmission shafts to be connected to each other. Thereby, the torque is transmitted to each of the left and right axle shafts (Refer to Patent Document 1).

PRIOR ART DOCUMENT

Patent Document

Patent Document 1: U.S. Pat. No. 6,620,072

SUMMARY OF THE INVENTION

Incidentally, partition walls are disposed inside of the differential body configuring part of the axle device, and a gear room for accommodating the differential mechanism is defined by the partition walls. There are two kinds of differential bodies, one being of a one-piece structure in which a section forming the gear room and the partition walls are integrally formed, and the other being of a two-piece structure in which the section forming the gear room and the partition walls are separately formed. The differential body of the one-piece structure can cut down more on the number of components and the assembly man-hours as compared to those of the two-piece structure, therefore to simplify the axle device. The axle device according to Patent Document 1 has the differential body of the two-piece structure, wherein a piston is disposed in a piston accommodating part disposed on a surface of the partition wall in a gear room side.

However, since partitions are arranged on both the left and right sides in the gear room in the differential body of the one-piece structure, a space of the gear room is made narrower in accordance therewith, causing a processing work in the gear room to be difficult. Accordingly, the differential body of the one-piece structure can reduce the number of components and the assembly man-hours and on the other hand, has a problem with difficulty of forming the piston accommodating section on the surface of the partition wall in the gear room side.

The present invention is made in view of the aforementioned problems in the conventional technology, and an object of the present invention is to provide a vehicle axle device that can simplify the configuration of a differential body.

The present invention is applied to a vehicle axle device, comprising: left and right axle shafts to which left and right wheels are respectively attached; a hollow differential body that is disposed between left and right axle tubes accommodating the left and right axle shafts and in both sides of a left-right direction of which partition walls each having a through hole penetrating in the left-right direction are respectively arranged; and a differential mechanism that is disposed between the left and right partition walls of the differential body to transmit a rotational force of a drive source to the left and right axle shafts, wherein the differential mechanism includes: a differential case that is rotatably supported through bearings on left and right retainers respectively attached in the through holes of the left and right partition walls and is rotated by the drive source; a plurality of pinion gears that are arranged in the differential case and rotate together with the differential case; left and right side gears that are arranged in the differential case and are respectively engaged with the respective pinion gears;

and left and right transmission shafts that are connected to the respective side gears to transmit the rotation of the differential case to the left and right axle shafts.

The present invention is characterized in that: the differential case is therein provided with a plurality of rotating discs that are spline-coupled to an outer peripheral side of one side gear of the left and right side gears and a plurality of non-rotating discs that are arranged between the plurality of rotating discs and are non-rotatable relative to the differential case and movable in the left-right direction; a pressure ring is disposed between one retainer of the left and right retainers positioned in the one side gear-side and the non-rotating disc to press the non-rotating disc against the rotating disc; a piton accommodating part is disposed in the one retainer in a position facing the pressure ring in the left-right direction; and a piston is disposed in the piston accommodating part of the one retainer, the piston being displaced by hydraulic pressures to press the non-rotating disc via the pressure ring against the rotating disc and couple the left and right transmission shafts.

According to the present invention, the piston accommodating part is disposed in the one retainer of the left and right retainers and the piston can be disposed in the piston accommodating part disposed in the one retainer. Thereby, only by attaching the one retainer into the through hole in the partition wall, the piston can be incorporated in the differential mechanism accommodated in the differential body. Accordingly, for example, as compared to a case of forming the piston accommodating part on the partition wall of the differential body, the structure of the differential body can be more simplified.

MODE FOR CARRYING OUT THE INVENTION

Hereinafter, descriptions will be in detail made by taking a case where vehicle axle devices according to an embodiment in the present invention are mounted on a wheel loader, as an example with reference to FIG. 1 to FIG. 14.

Figure 1:
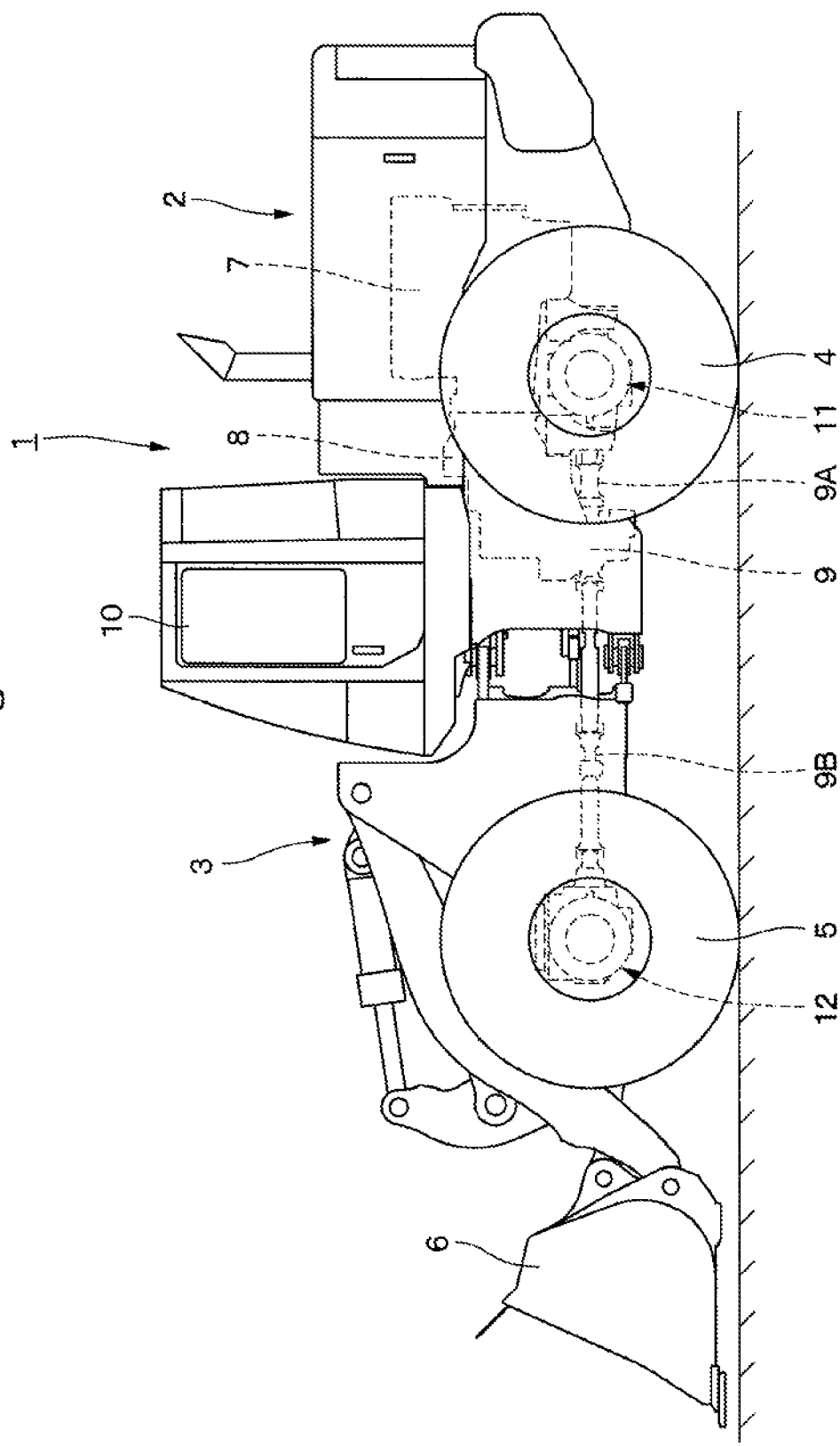
FIG. 1 is a front view illustrating a wheel loader provided with vehicle axle devices according to an embodiment of the present invention.

In FIG. 1, a wheel loader 1 includes a rear vehicle body 2, a front vehicle body 3, rear wheels 4, front wheels 5, a working mechanism 6 that is disposed on the front side of the front vehicle body 3, and axle devices 11, 12 to be described later. The front vehicle body 3 is coupled to the front side of the rear vehicle body 2 to be capable of swinging in a left-right direction. The rear wheels 4 are arranged in both sides of the rear vehicle body 2 in the left-right direction, and the front wheels 5 are arranged in both sides of the front vehicle body 3 in the left-right direction.

Here, the rear vehicle body 2 is provided with an engine 7 as a drive source, a torque converter 8, a transmission 9, a hydraulic pump (unillustrated) and the like, which are mounted thereon. The transmission 9 is connected to the rear axle device 11 through a propeller shaft 9A extending in a front-rear direction and is connected to the front axle device 12 through a propeller shaft 9B. A cab 10 in which an operator gets is disposed on the upper side of the rear vehicle body 2.

The rear axle device 11 is disposed to be positioned on the lower side of the rear vehicle body 2. The rear axle device 11 is formed to extend in the left-right direction, and the rear wheels 4 are respectively mounted to both end parts of the rear axle device 11 in the left-right direction.

The front axle device 12 is disposed to be positioned on the lower side of the front vehicle body 3. The front axle device 12 is formed to extend in the left-right direction as similar to the rear axle device 11, and the front wheels 5 are respectively mounted to both end parts of the front axle device 12 in the left-right direction.

Here, the rear axle device 11 and the front axle device 12 are configured in the same way with each other except for a point where a connection position between the propeller shafts 9A, 9B differs therebetween. Therefore, in the present embodiment, an explanation will be in detail made of the configuration of the front axle device 12, and an explanation of the configuration of the rear axle device 11 is to be omitted.

Figure 2:
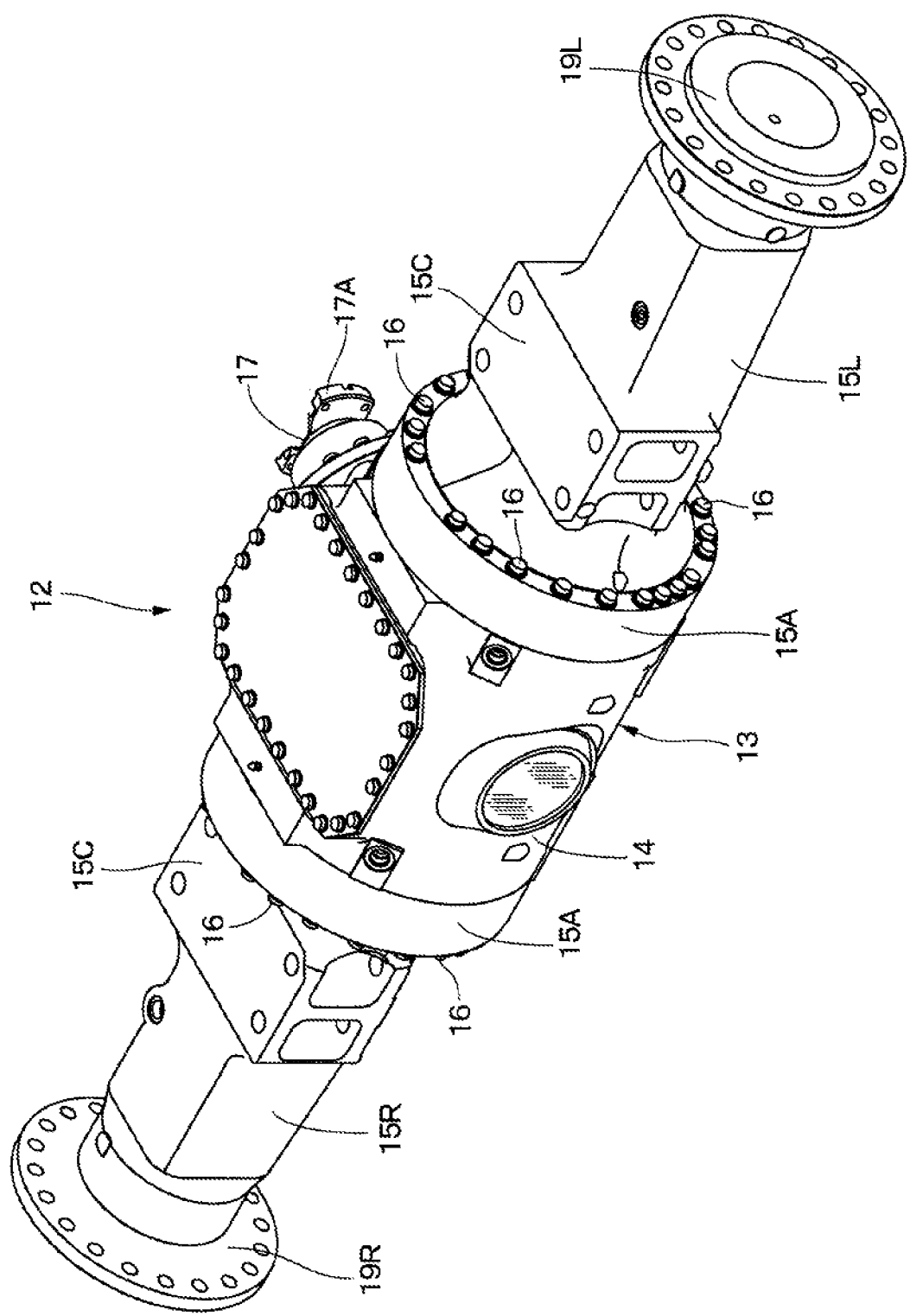
FIG. 2 is an outside appearance perspective view illustrating a front axle device in FIG. 1 as viewed from forward in an enlarging manner.

The front axle device 12 is connected to the propeller shaft 9B to drive/rotate the left and right front wheels 5. The front axle device 12 includes, as illustrated in FIG. 2 and FIG. 3, a casing 13, left and right axle shafts 19L, 19R, a differential mechanism 20, left and right planetary gear reduction mechanisms 51L, 51R, left and right brake mechanisms 55L, 55R, which will be described later, and the like.

The casing 13 configures an outer shell of the front axle device 12. The casing 13 is provided with a hollow differential body 14 positioned in an immediate part in the left-right direction, and left and right axle tubes 15L, 15R positioned in both sides of the differential body 14 in the left-right direction. The differential mechanism 20 and the left and right brake mechanisms 55L, 55R are accommodated in the differential body 14. The left and right axle shafts 19L, 19R are respectively supported in the left and right axle tubes 15L, 15R to be rotatable therein. The front wheels 5 are respectively attached to the front end sides of the left and right axle shafts 19L, 19R.

Figure 3:
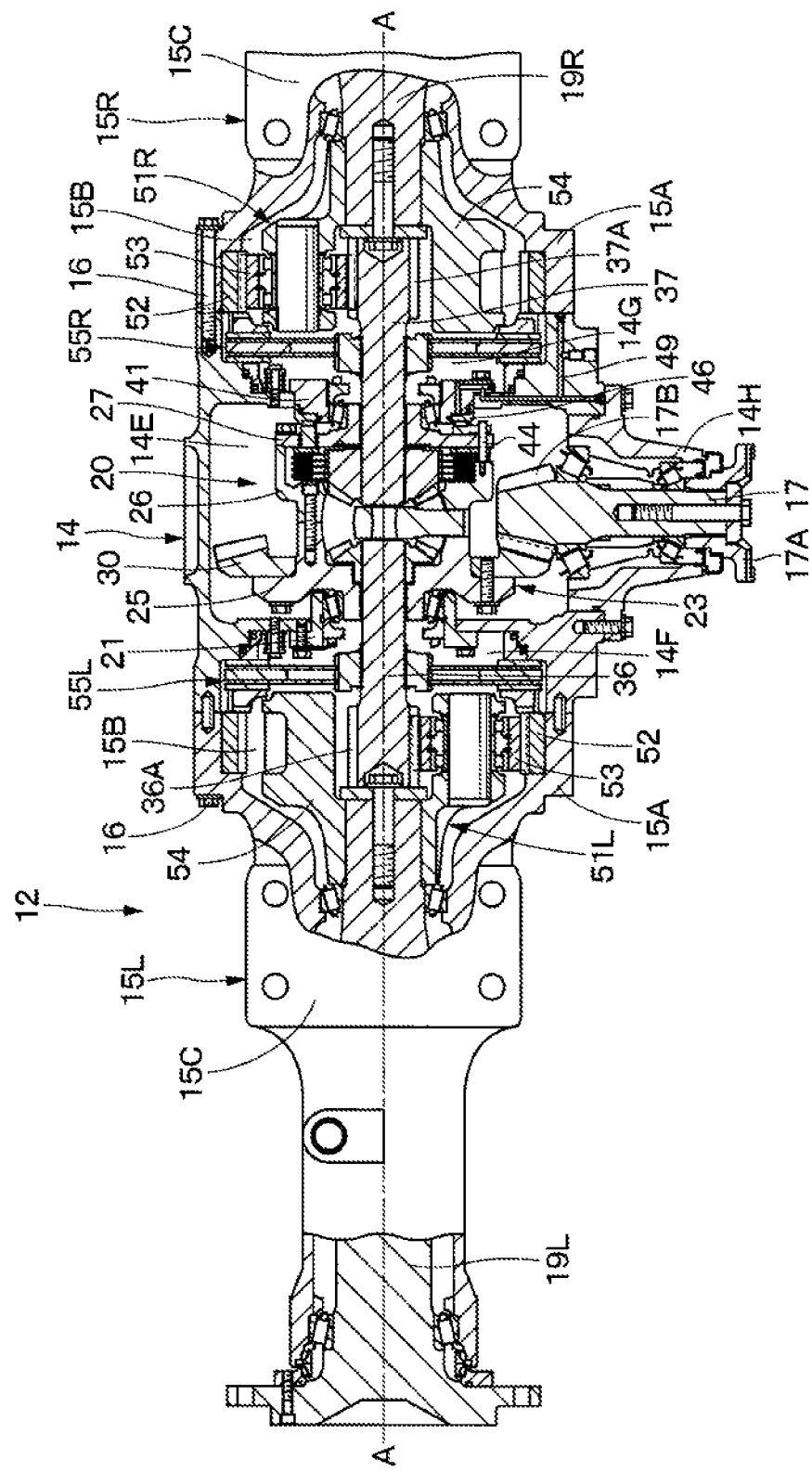
FIG. 3 is a cross section illustrating an internal structure of the front axle device.
Figure 4:
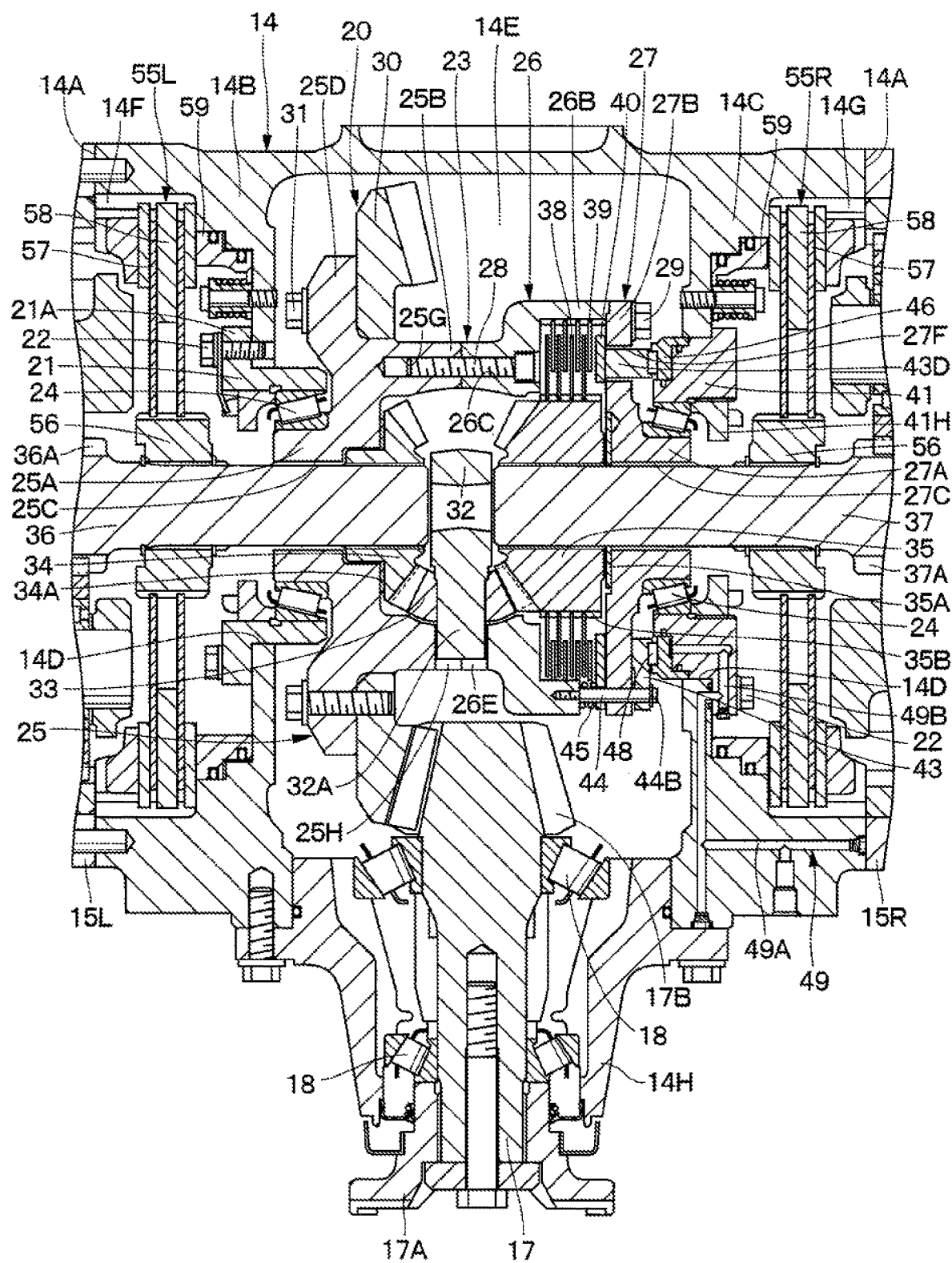
FIG. 4 is a cross section illustrating an essential part of a differential body, a differential mechanism and the like in FIG. 3 in an enlarging manner.

As illustrated in FIG. 3 and FIG. 4, the differential body 14 is composed of a cylindrical tubular body centering at an axis A—A extending in the left-right direction (axially), and has a one-piece structure in which a left partition wall 14B and a right partition wall 14C, which will be described later, are integrally formed. Both ends of the differential body 14 in the left-right direction are respectively formed as opening ends 14A. The left and right partition walls 14B, 14C are respectively arranged integrally with both ends of the differential body 14 in the left-right direction. The left and right partition walls 14B, 14C each extend from an inner peripheral surface of a section deeper than the opening end 14A to the radial inward. Through holes 14D respectively smaller in diameter than the opening ends 14A are formed in the left and right partition walls 14B, 14C to penetrate therethrough in the left-right direction (axially).

The inside of the differential body 14 is sectioned into a gear room 14E positioned between the left and right partition walls 14B, 14C, and left and right brake rooms 14F, 14G arranged in both of the left side and the right side across the gear room 14E. The differential mechanism 20 is accommodated in the gear room 14E, the brake mechanism 55L is accommodated in the left brake room 14F, and the brake mechanism 55R is accommodated in the right brake room 14G. A projecting tube 14H is disposed on the rear side of the differential body 14 (in the rear axle device 11-side) to project toward the transmission 9. The projecting tube 14H opens to the gear room 14E, and a later-described input shaft 17 is supported in the projecting tube 14H to be rotatable therein.

Base end sides of the left and right axle tubes 15L, 15R are formed as shorter cylindrical parts 15A each having a radial dimension equal to each of both ends of the differential body 14 in the left-right direction. The insides of the left and right cylindrical parts 15A are formed as reduction gear rooms 15B, and the later-described planetary gear reduction mechanisms 51L, 51R are respectively accommodated in the left and right reduction gear rooms 15B. Front end sides of the left and right axle tubes 15L, 15R each are formed in an angular, tubular shape and extend outwards in the left-right direction from the cylindrical part 15A. The cylindrical parts 15A of the left and right axle tubes 15L, 15R are attached to the opening ends 14A of the differential body 14 by using a plurality of bolts 16. The left and right axle tubes 15L, 15R extend to be smaller in diameter toward both sides thereof in the left-right direction from the differential body 14.

Mount parts 15C, each formed in a rectangular shape, are arranged on the top surface sides of the left and right axle tubes 15L, 15R to be adjacent to the cylindrical parts 15A. The left and right mount parts 15C are attached to the front vehicle body 3 of the wheel loader 1. That is, the front axle device 12 is an inboard type of an axle device in which the differential mechanism 20, the left and right planetary gear reduction mechanisms 51L, 51R and the left and right brake mechanisms 55L, 55R are arranged between the mount parts 15C of the left and right axle tubes 15L, 15R. It should be noted that the rear axle device 11 is attached via an axle support (unillustrated) to the rear vehicle body 2.

The input shaft 17 is disposed through two bearings 18 in the projecting tube 14H of the differential body 14 to be rotatable therein. A connection flange 17A is attached to one end, which projects outside of the projecting tube 14H, of the input shaft 17, and this connection flange 17A is connected to the propeller shaft 9B. A drive pinion 17B composed of a bevel gear is formed on the other end, which projects into the gear room 14E of the differential body 14, of the input shaft 17, and this drive pinion 17B is engaged with a later-described ring gear 30.

The left axle shaft 19L is disposed to axially extend in the left axle tube 15L, and the right axle shaft 19R is disposed to axially extend in the right axle tube 15R. The left and right axle shafts 19L, 19R are arranged on the axis A-A. The base end side of the axle shaft 19L is spline-coupled to a carrier 54 of the later-described planetary gear reduction mechanism 51L. The front end side of the axle shaft 19L projects from the axle tube 15L, and the front wheel 5 is attached to the front end thereof. The base end side of the axle shaft 19R is spline-coupled to a carrier 54 of the later-described planetary gear reduction mechanism 51R. The front end side of the axle shaft 19R projects from the axle tube 15R, and the front wheel 5 is attached to the front end thereof.

Next, an explanation will be made of the differential mechanism 20 according to the present embodiment.

The differential mechanism 20 is disposed in the gear room 14E in the differential body 14. The differential mechanism 20 distributes and transmits the drive force (rotational force) of the engine 7 as a drive source to the left and right front wheels 5 through the left and right axle shafts 19L, 19R. Here, the differential mechanism 20 is configured of a limited slip differential mechanism that temporarily becomes in a lock state (in a differential lock state) in association with a condition. The differential mechanism 20 includes a differential case 23, the ring gear 30, a plurality of pinion gears 33, left and right side gears 34, 35, left and right transmission shafts 36, 37, a plurality of rotating discs 38, a plurality of non-rotating discs 39, a piston 46, which will be described later, and the like.

A cylindrical left retainer 21 having a collar part 21A is attached into the through hole 14D of the left partition wall 14B configuring part of the differential body 14, and the collar part 21A of the left retainer 21 is fixed on the left partition wall 14B by using bolts 22. In addition, a later-described right retainer 41 is attached into the through hole 14D of the right partition wall 14C configuring part of the differential body 14, and the right retainer 41 is fixed on the right partition wall 14C by using bolts 22.

The differential case 23 is disposed in the gear room 14E of the differential body 14. The differential case 23 is supported through bearings 24 on the left retainer 21 and the right retainer 41 to be rotatable on the axis A-A. The differential case 23 is formed as an outer shell of the differential mechanism 20, and is configured of a first differential case 25, a second differential case 26, and a third differential case 27.

Figure 6:
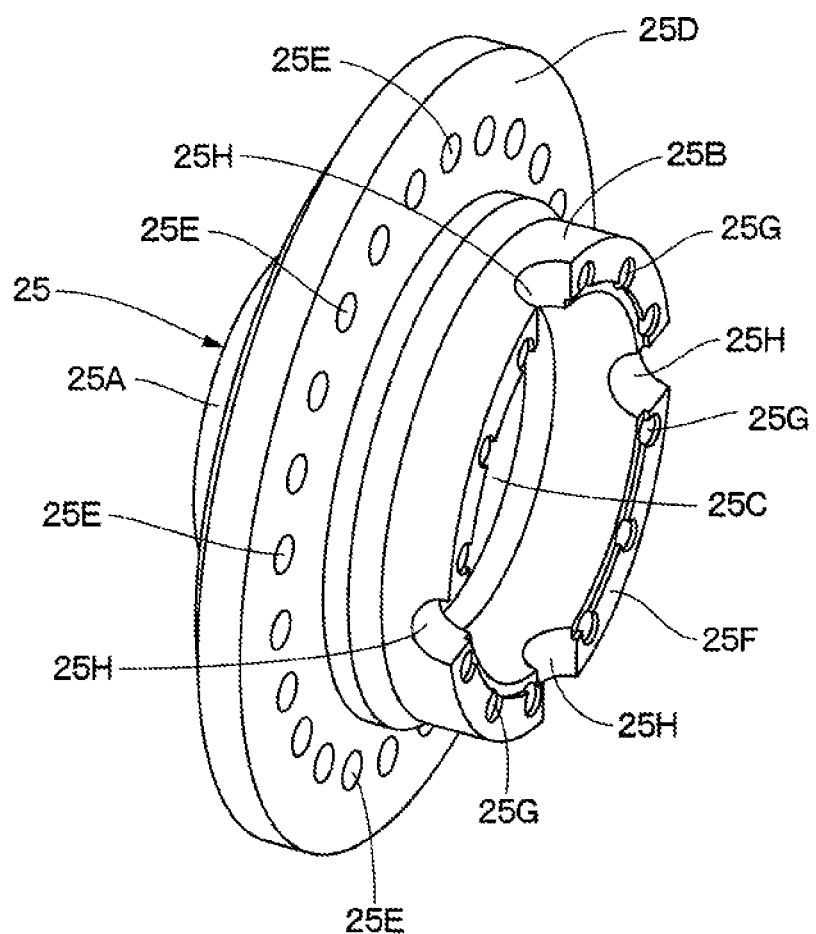
FIG. 6 is a perspective view illustrating a first differential case as a unit.

As illustrated in FIG. 4 and FIG. 6, the first differential case 25 is a stepped cylindrical body having a small-diameter cylindrical part 25A and a large-diameter cylindrical part 25B, wherein a shaft insert hole 25C is formed at the center part to penetrate in the left-right direction. A disc-shaped collar part 25D in a large diameter is disposed between the small-diameter cylindrical part 25A and the large-diameter cylindrical part 25B. The small-diameter cylindrical part 25A is supported through the bearing 24 on the left retainer 21. A plurality of bolt insert holes 25E are formed in the collar part 25D over an entire periphery thereof. A plurality of screw holes (female screw holes) 25G are formed on an axial end surface 25F of the large-diameter cylindrical part 25B over an entire periphery thereof. In addition, four recessed parts 25H in a semicircle shape are formed on the axial end surface 25F of the large-diameter cylindrical part 25B at angular intervals of 90 degrees.

Figure 7:
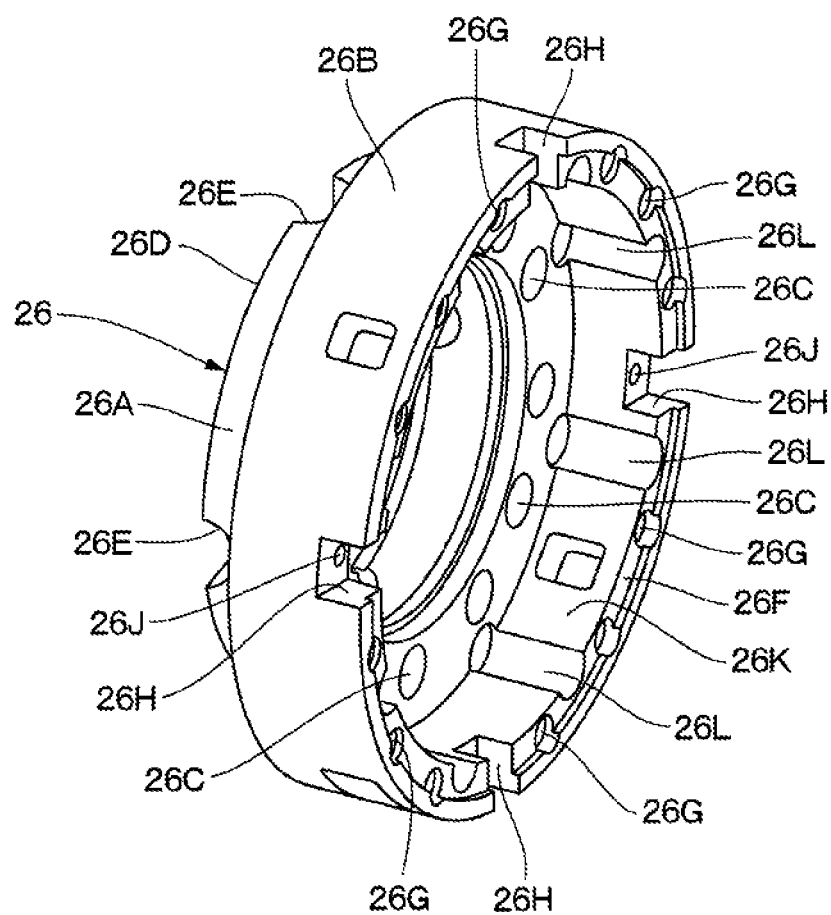
FIG. 7 is a perspective view illustrating a second differential case as a unit.

As illustrated in FIG. 4 and FIG. 7, the second differential case 26 is formed as a hollow stepped cylindrical body having a small-diameter cylindrical part 26A and a large-diameter cylindrical part 26B. The small-diameter cylindrical part 26A has an outer diameter dimension and a thickness equal to those of the large-diameter cylindrical part 25B of the first differential case 25. A plurality of bolt insert holes 26C are formed in the small-diameter cylindrical part 26A over an entire periphery thereof to penetrate in the left-right direction. Each of the bolt insert holes 26C corresponds to each of the screw holes 25G of the first differential case 25. Four recessed parts 26E in a semicircle shape are formed on the axial end surface 26D of the small-diameter cylindrical part 26A at angular intervals of 90 degrees. Each of the recessed parts 26E corresponds to each of the recessed parts 25H of the first differential case 25. A plurality of screw holes 26G are formed on an axial end surface 26F of the large-diameter cylindrical part 26B over an entire periphery thereof. Four rectangular recessed parts 26H are formed on the axial end surface 26F at angular intervals of 90 degrees. A screw hole 26J is formed on the bottom part of each of the recessed parts 26H. Further, a plurality of (for example, eight) recessed grooves 26L in a semicircle shape in cross section axially extending are formed on an inner peripheral surface 26K of the large-diameter cylindrical part 26B at equal angular intervals. Each of projecting parts 39A of the non-rotating discs 39 to be described later is engaged to each of the recessed grooves 26L.

Figure 8:
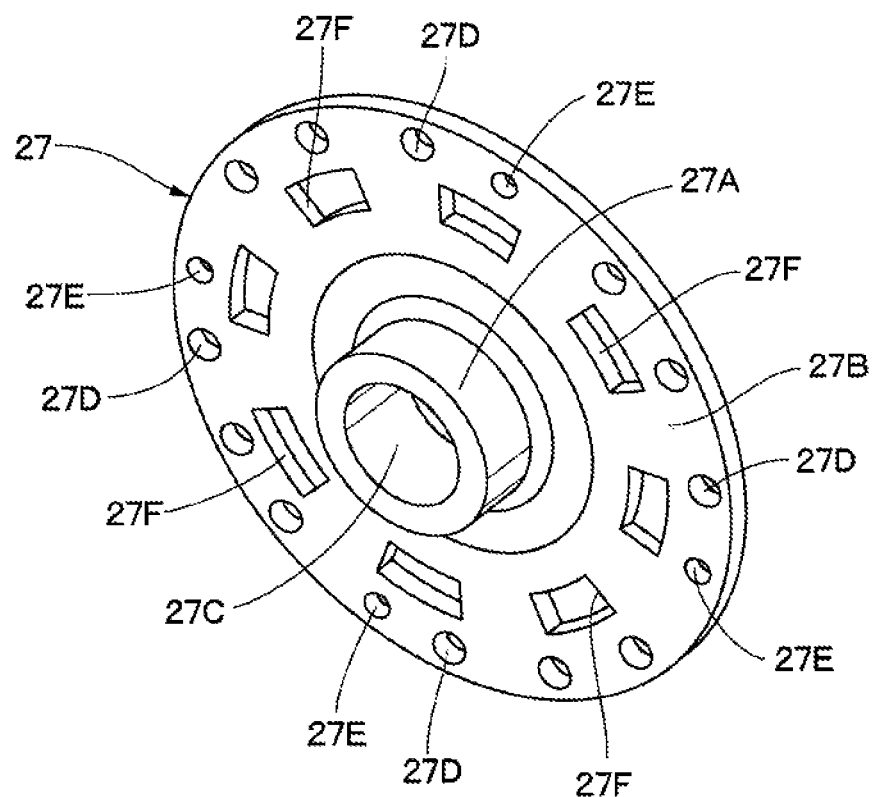
FIG. 8 is a perspective view illustrating a third differential case as a unit.

The third differential case 27 is attached to the second differential case 26 to be positioned at the opposite side to the first differential case 25 in the left-right direction. As illustrated in FIG. 4 and FIG. 8, the third differential case 27 has a cylindrical part 27A and a disc-shaped collar part 27B larger in diameter than the cylindrical part 27A. The collar part 27B has an outer diameter dimension equal to that of the large-diameter cylindrical part 26B of the second differential case 26. A shaft insert hole 27C is formed at the center part of the third differential case 27 to axially penetrate therethrough. The cylindrical part 27A is supported through the bearing 24 on the right retainer 41. A plurality of bolt insert holes 27D are formed in the collar part 27B over an entire periphery thereof. Each of the bolt insert holes 27D corresponds to each of the screw holes 26G in the second differential case 26. In addition, four pin insert holes 27E, each smaller in diameter than the bolt insert hole 27D, are formed in the collar part 27B at angular intervals of 90 degrees. Each of the pin insert holes 27E corresponds to each of the screw holes 26J in the second differential case 26. Further, a plurality of (for example, eight) rectangular holes 27F are formed in sections, which are positioned closer to the radial inward than the respective bolt insert holes 27D, of the collar part 27B to axially penetrate therethrough. Each of rectangular projections 43D of a later-described pressure ring 43 is inserted in each of the rectangular holes 27F to be movable relative thereto.

In addition, bolts 28 are respectively inserted in the respective bolt insert holes 26C of the second differential case 26. The respective bolts 28 are threaded into the respective screw holes 25G of the first differential case 25. Thereby, the second differential case 26 is fixed to the first differential case 25. At this time, the axial end surface 25F of the first differential case 25 abuts on the axial end surface 26D of the second differential case 26 (small-diameter cylindrical part 26A). Each of shafts 32A of a later-described spider 32 is engaged between the recessed part 25H of the first differential case 25 and the recessed part 26E of the second differential case 26. In addition, bolts 29 are respectively inserted in the respective bolt insert holes 27D of the third differential case 27. The respective bolts 29 are threaded into the respective screw holes 26G of the second differential case 26. Thereby, the third differential case 27 is fixed to the second differential case 26. Thereby, the differential case 23 composed of the first, second and third differential cases 25, 26, 27 is assembled. The spider 32, the plurality of pinion gears 33, and the left and right side gears 34, 35 are arranged in the inside of the differential case 23.

The ring gear 30 is attached to the differential case 23 in the gear room 14E of the differential body 14. The ring gear 30 is formed of an annular bevel gear. The ring gear 30 is fixed to the collar part 25D of the first differential case 25 by a plurality of bolts 31 inserted in the respective bolt insert holes 25E of the first differential case 25. The ring gear 30 is engaged with the drive pinion 17B of the input shaft 17. Accordingly, the rotation of the engine 7 is transmitted through the transmission 9 to the input shaft 17, and the drive pinion 17B is engaged with the ring gear 30, thereby causing the differential case 23 to rotate.

Figure 5:
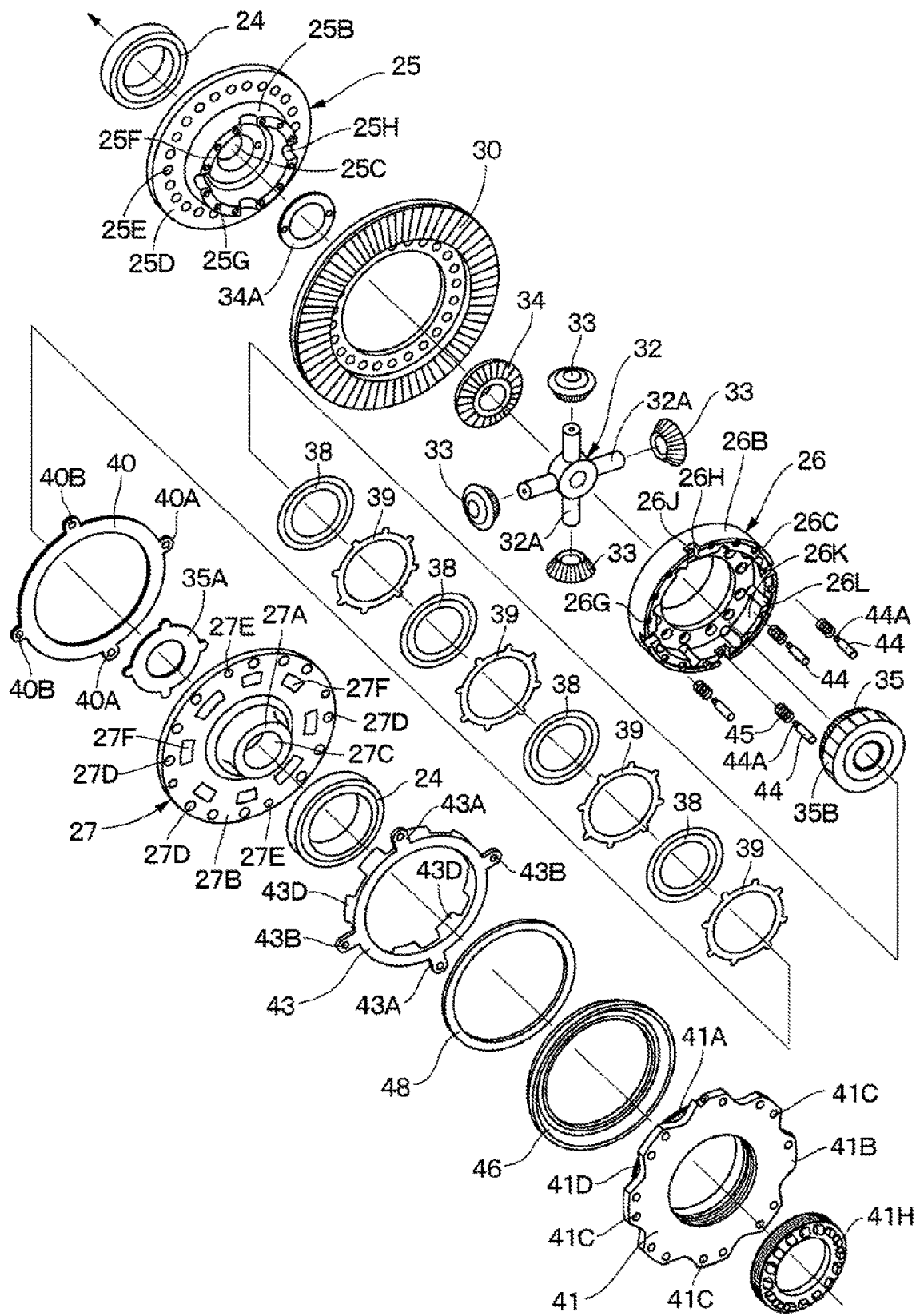
FIG. 5 is an exploded perspective view illustrating main components in the differential mechanism.

The spider 32 is disposed within the differential case 23. As illustrated in FIG. 5, the spider 32 has four shafts 32A combined in a cross shape at angular intervals of 90 degrees. The front end side of each of the shafts 32A is held tightly between the recessed part 25H of the first differential case 25 and the recessed part 26E of the second differential case 26 configuring part of the differential case 23. The spider 32 rotates together with the differential case 23.

The plurality of (four) pinion gears 33 are respectively supported on the four shafts 32A arranged in the spider 32 to be rotatable thereon. The pinion gears 33 each are composed of a bevel gear and are united by the spider 32. The respective pinion gears 33 are engaged with the left side gear 34 and the right side gear 35 within the differential case 23.

The left side gear 34 and the right side gear 35 are respectively arranged in the differential case 23. The left and right side gears 34, 35 are paired in the left-right direction across the spider 32. In the present embodiment, the right side gear 35 configures one side gear of the left and right side gears. The left and right side gears 34, 35 each are composed of a bevel gear, and are engaged with each of the pinion gears 33 supported by the spider 32. A thrust plate 34A is disposed between the left side gear 34 and the first differential case 25 to reduce abrasion of the first differential case 25. A thrust plate 35A is disposed between the right side gear 35 and the third differential case 27 to reduce abrasion of the third differential case 27. In addition, a shaft spline part 35B is formed on an outer peripheral surface of the right side gear 35.

The left transmission shaft 36 is connected to the left side gear 34, and the right transmission shaft 37 is connected to the right side gear 35. The left and right transmission shafts 36, 37 are arranged to be paired on the axis A-A. The left transmission shaft 36 transmits the rotation of the differential case 23 through the planetary gear reduction mechanism 51L to the axle shaft 19L. The right transmission shaft 37 transmits the rotation of the differential case 23 through the planetary gear reduction mechanism 51R to the axle shaft 19R.

The base end side of the left transmission shaft 36 is spline-coupled to an inner peripheral side of the left side gear 34. The front end side of the left transmission shaft 36 extends through the left partition wall 14B of the differential body 14 into the axle tube 15L. A sun gear 36A configuring part of the planetary gear reduction mechanism 51L is formed integrally with the front end of the left transmission shaft 36. On the other hand, the base end side of the right transmission shaft 37 is spline-coupled to an inner peripheral side of the right side gear 35. The front end side of the right transmission shaft extends through the right partition wall 14C of the differential body 14 into the axle tube 15R. A sun gear 37A configuring part of the planetary gear reduction mechanism 51R is formed integrally with the front end of the right transmission shaft 37.

The plurality of rotating discs 38 and the plurality of non-rotating discs 39 are arranged between the inner peripheral surface 26K of the second differential case 26 configuring part of the differential case 23 and the shaft spline part 35B of the right side gear 35. The respective rotating discs 38 and the respective non-rotating discs 39 each are composed of an annular plate body and are arranged to alternately overlap axially.

Figure 9:
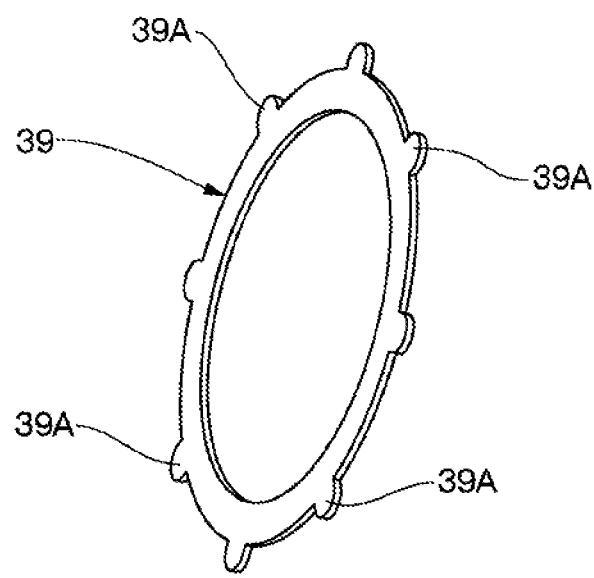
FIG. 9 is a perspective view illustrating a non-rotating disc as a unit.

Each of the rotating discs 38 is spline-coupled on the inner peripheral side to the shaft spline part 35B of the right side gear 35. Accordingly, each of the rotating discs 38 is rotatable relative to the differential case 23 together with the right side gear 35 in a state of being movable in an axial direction of the right side gear 35. As illustrated in FIG. 9, each of the non-rotating discs 39 has the plurality of (for example, eight) projecting parts 39A over an entire periphery on the outer peripheral side. Each of the projecting parts 39A is engaged with each of the recessed grooves 26L formed on the inner peripheral surface 26K of the second differential case 26. Accordingly, each of the non-rotating discs 39 is held in a state of being axially movable relative to the differential case 23 and being non-rotatable relative to the differential case 23.

Figure 10:
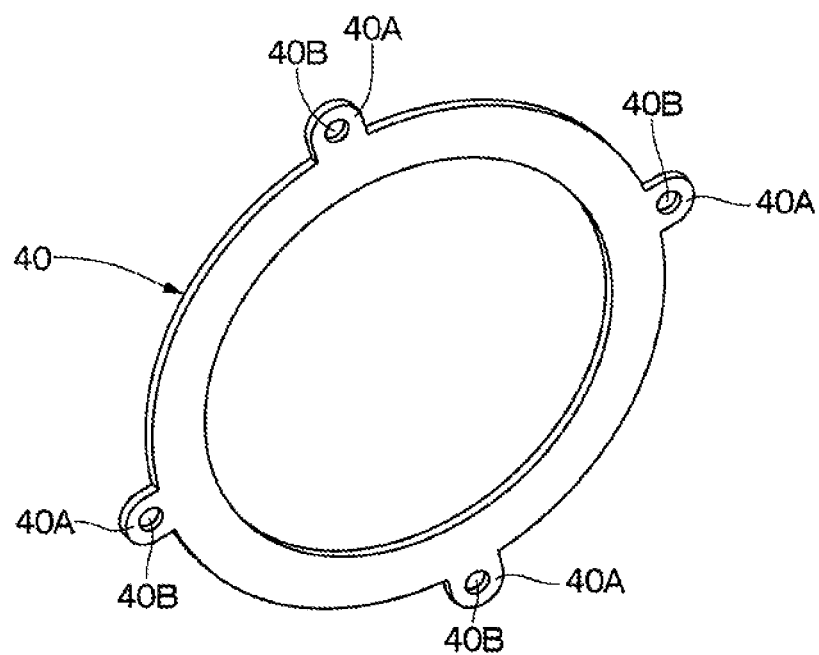
FIG. 10 is a perspective view illustrating a pressing plate as a unit.

A pressing plate 40 is disposed between the third differential case 27 and the non-rotating disc 39 to be positioned within the differential case 23. As illustrated in FIG. 10, the pressing plate 40 is formed of an annular plate body, and four projecting parts 40A are arranged on the outer peripheral side of the pressing plate 40 to project to the radial outward at angular intervals of 90 degrees. The four projecting parts 40A are engaged to the respective recessed parts 26H of the second differential case 26. Accordingly, the pressing plate 40 rotates together with differential case 23 in a state of being axially movable along the respective recessed parts 26H. Pin insert holes 40B are respectively formed in the respective projecting parts 40A of the pressing plate 40. Each of the pin insert holes 40B corresponds to the screw hole 26J formed in each of the recessed parts 26H of the second differential case 26.

Figure 12:
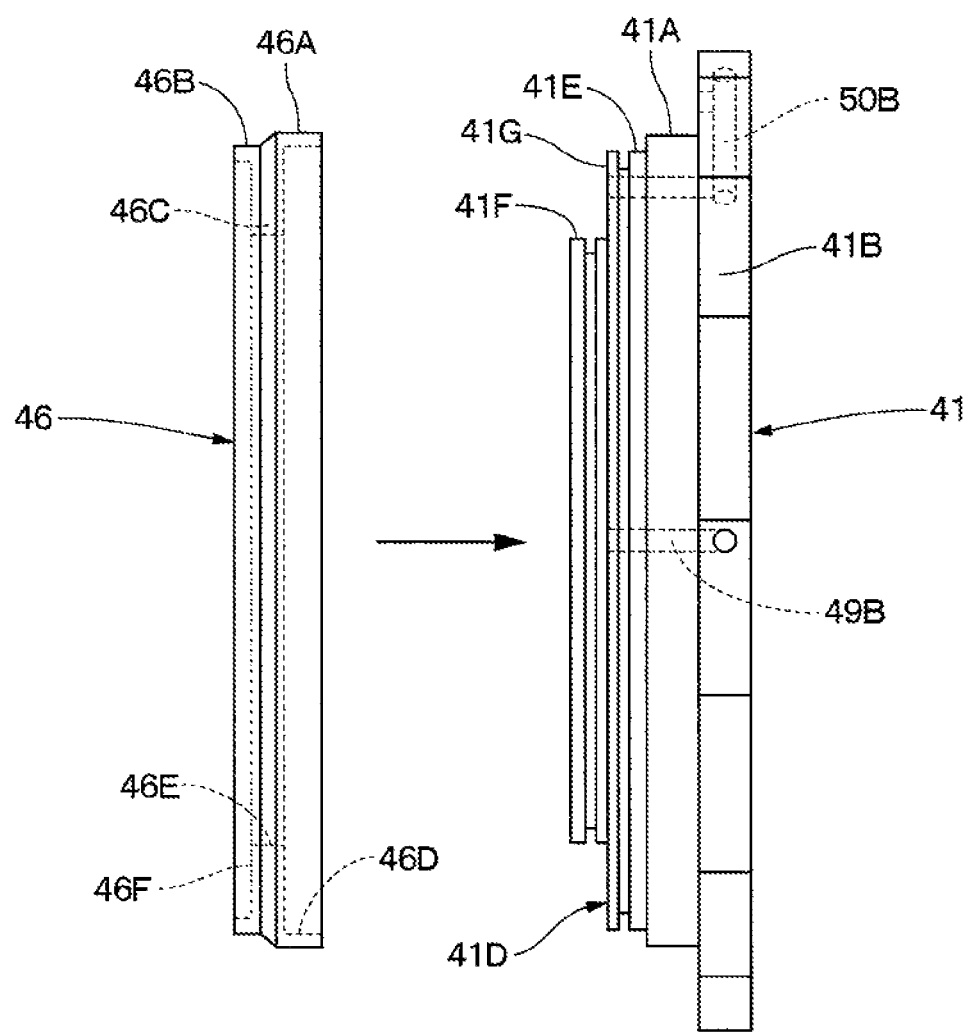
FIG. 12 is a side view illustrating a state of attaching a piston to a right retainer.
Figure 13:
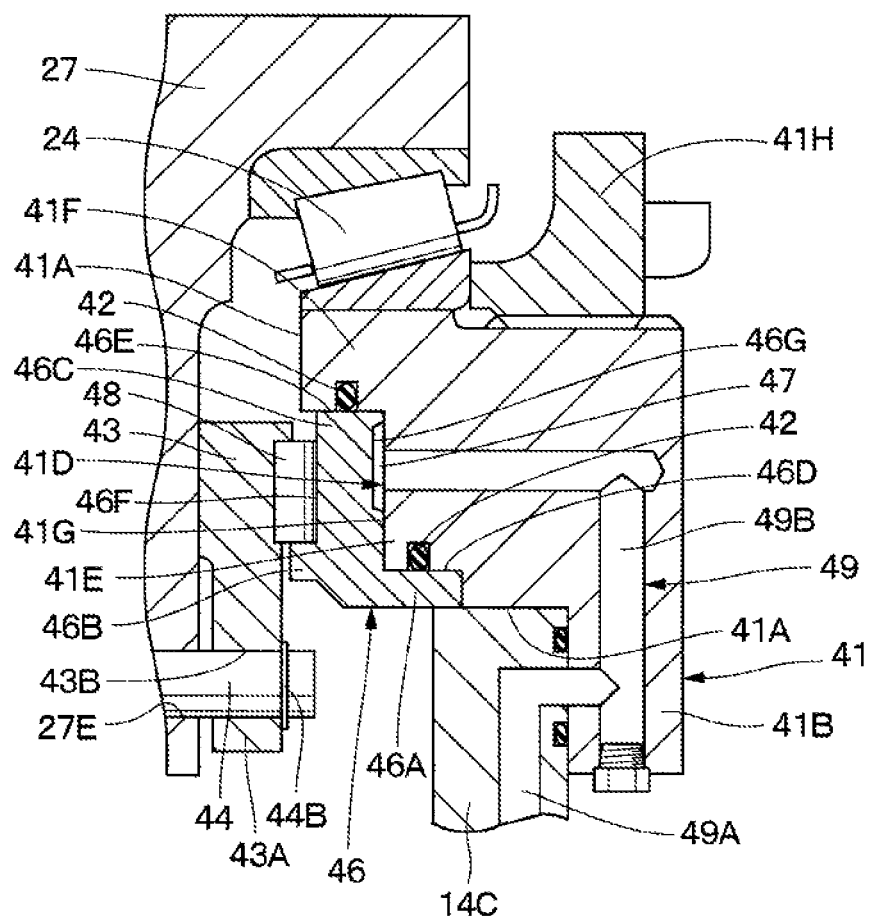
FIG. 13 is a cross section illustrating an essential part of the right retainer, the piston, an oil chamber, an oil passage and the like in FIG. 4 in an enlarging manner.
Figure 14:
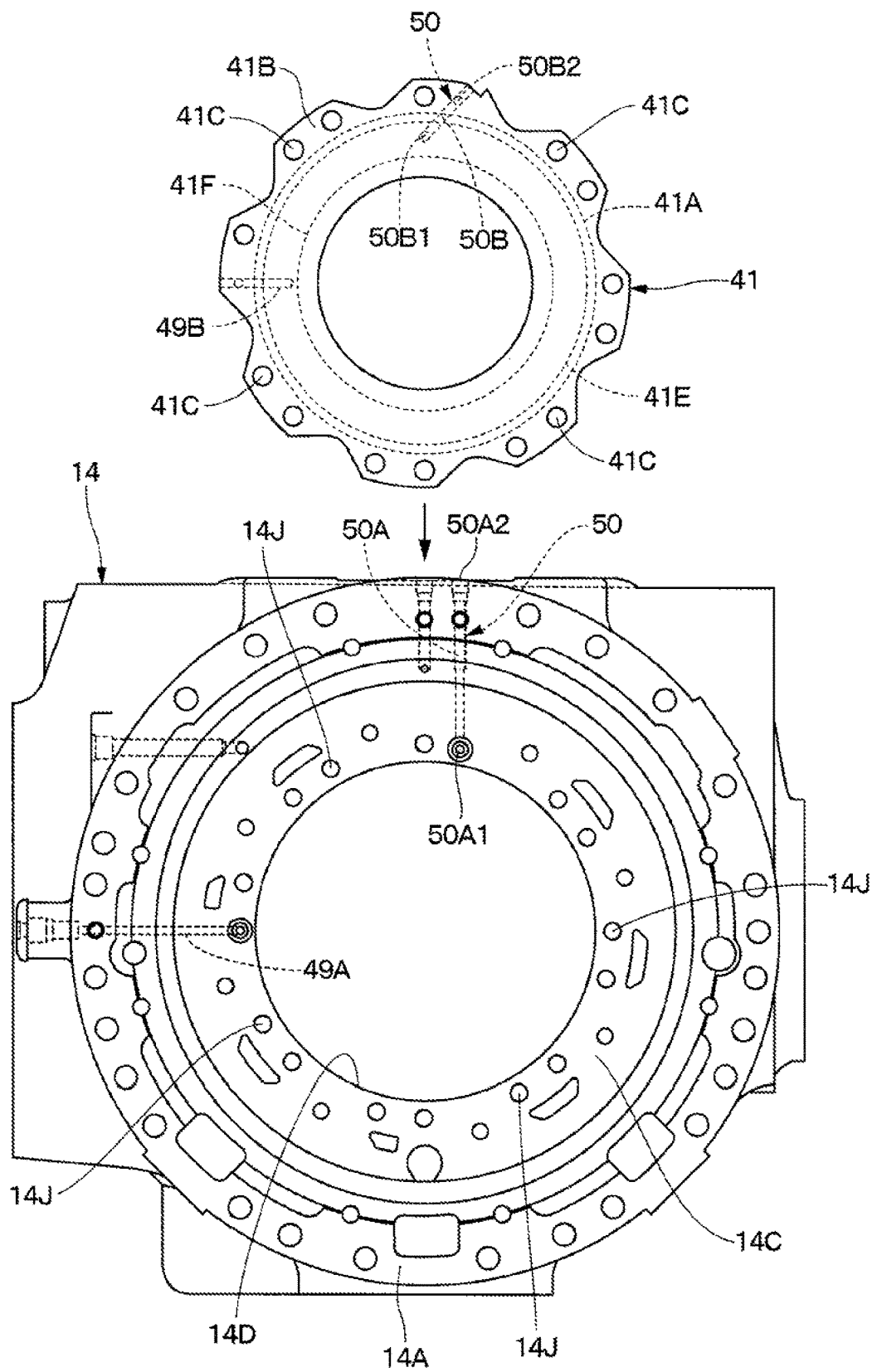
FIG. 14 is a front view illustrating a state of attaching the right retainer to a right partition wall of a differential body.

The right retainer 41 is attached to the through hole 14D of the right partition wall 14C configuring part of the differential body 14. The right retainer 41 configures one retainer positioned in the right side gear 35-side. As illustrated in FIG. 12 to FIG. 14, the right retainer 41 is formed in a stepped cylindrical shape having a cylindrical part 41A fitted in the through hole 14D, and a collar part 41B larger in diameter than the cylindrical part 41A. As illustrated in FIG. 14, a plurality of bolt insert holes 41C are formed in the collar parts 41B of the right retainer 41 over an entire periphery thereof. Bolt 22 are inserted in the respective bolt insert holes 41C, and each of the bolts 22 is threaded into each of the screw holes 14J arranged in the right partition wall 14C of the differential body 14. Thereby, the right retainer 41 is attached to the right partition wall 14C in a state where the cylindrical part 41A is fitted into the through hole 14D.

A piston accommodating part 41D having a step part of two steps is formed in a section, which axially faces the non-rotating disc 39, of the right retainer 41. The piston accommodating part 41D is formed by cutting an outer peripheral surface of the cylindrical part 41A over an entire periphery thereof. This piston accommodating part 41D has a large-diameter step part 41E adjacent to the end surface of the cylindrical part 41A, and a small-diameter step part 41F adjacent to the end surface of the large-diameter step part 41E. The later-described piston 46 is attached to the piston accommodating part 41D. O-rings 42 are respectively attached to outer peripheral surfaces of the large-diameter step part 41E and the small-diameter step part 41F. The O-ring 42 maintains liquid-tight sealing between the piston 46 and the right retainer 41 (piston accommodating part 41D). In addition, a later-described retainer-side oil passage 49B opens to an end surface 41G of the piston accommodating part 41D positioned in a boundary part between the large-diameter step part 41E and the small-diameter step part 41F. Further, a nut 41H is threaded on an inner peripheral side of the right retainer 41, and pressures are given to the bearing 24 between the nut 41H and the third differential case 27.

Figure 11:
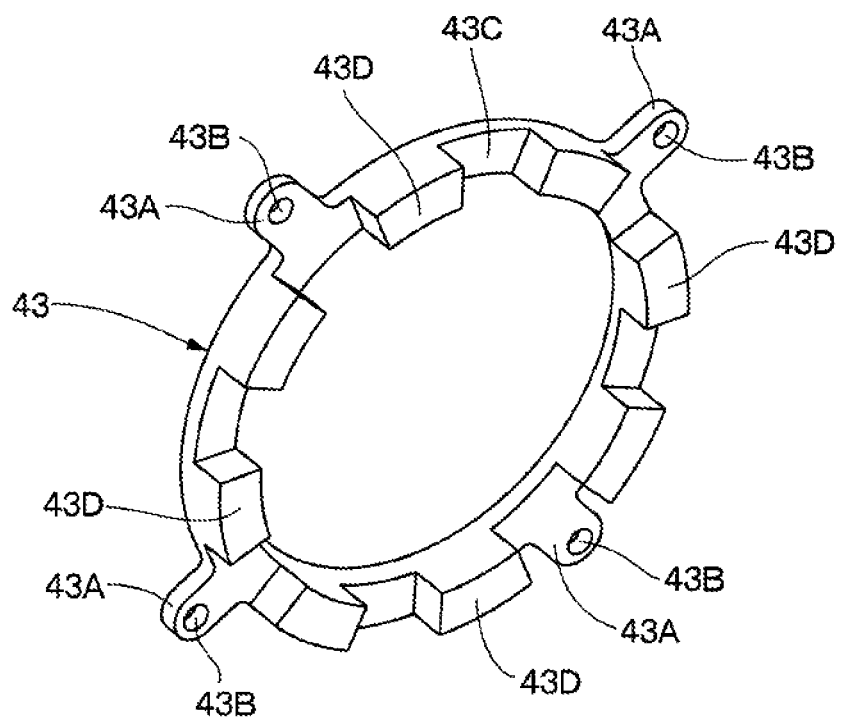
FIG. 11 is a perspective view illustrating a pressure ring as a unit.

The pressure ring 43 is disposed between the right retainer 41 and the non-rotating disc 39. The pressure ring 43 is pressed by the piston 46 to axially move and presses the non-rotating disc 39 against the rotating disc 38 via the pressing plate 40. As illustrated in FIG. 11, the pressure ring is formed as an annular body having an outer diameter dimension smaller in diameter than the collar part 27B of the third differential case 27. Four projecting parts 43A are arranged on the outer peripheral side of the pressure ring 43 to project to the radial outward at angular intervals of 90 degrees. Pin insert holes 43B are respectively formed in the four projecting parts 43A. Each of the pin insert holes 43B corresponds to the screw hole 26J formed in each of the recessed parts 26H of the second differential case 26.

A plurality of (for example, eight) rectangular projections 43D are arranged to project on an end surface 43C, which axially faces the third differential case 27, of the pressure ring 43. Each of the rectangular projections 43D is inserted in each of the rectangular holes 27F of the third differential case 27. The front end of each of the rectangular projections 43D abuts on the pressing plate 40.

Four pins 44 are arranged in the respective recessed parts 26H of the second differential case 26, and axially extend toward the right retainer 41. Each of the pins 44 has a screw part 44A, and this screw part 44A is threaded in the screw hole 26J formed in each of the recessed parts 26H. Each of the pins 44 projects outside of the differential case 23 through each of the pin insert holes 40B of the pressing plate 40 and each of the pin insert holes 27E of the third differential case 27. Each of the pins 44 projecting outside of the differential case 23 is inserted in each of pin insert holes 43B of the pressure ring 43. The pressure ring 43 axially moves while being guided by each of the pins 44. A stop ring 44B is attached in a projecting end side of each of the pins 44. The pressure ring 43 is prevented from being axially pulled out by the stop ring 44B.

Four return springs 45 each are arranged on an outer peripherical side of each of the pins 44 to be positioned between the respective recessed parts 26H of the second differential case 26 and the pressing plate 40. Each of the return springs 45 is composed of a compression spring and urges the pressing plate 40 to the piston 46-side (third differential case 27-side).

The piston 46 is disposed in the piston accommodating part 41D of the right retainer 41. As illustrated in FIG. 12 and FIG. 13, the piston 46 is formed in a stepped cylindrical shape having a large-diameter cylindrical part 46A and a small-diameter cylindrical part 46B. An inner-diameter projected part 46C in an annular shape is disposed on an inner peripheral side of a boundary part between the large-diameter cylindrical part 46A and the small-diameter cylindrical part 46B to extend to the radial inward. Here, an outer diameter dimension of the large-diameter cylindrical part 46A is set to be equal to that of the cylindrical part 41A of the right retainer 41. An inner peripheral surface 46D of the large-diameter cylindrical part 46A is slidably fitted on an outer peripheral surface of the large-diameter step part 41E of the right retainer 41. An inner peripheral surface 46E of the inner-diameter projected part 46C is slidably fitted on an outer peripheral surface of the small-diameter step part 41F of the right retainer 41.

In this way, the right retainer 41 is provided with the piston accommodating part 41D that is smaller in an outer diameter dimension than the cylindrical part 41A and is composed of the large-diameter step part 41E and the small-diameter step part 41F. The piston 46 is attached in the piston accommodating part 41D of the right retainer 41. As a result, the outer diameter dimension of the large-diameter cylindrical part 46A of the piston 46 is equal to the cylindrical part 41A of the right retainer 41. The piston 46 is inserted in the through hole 14D formed in the right partition wall 14C of the differential body 14 in a state of being incorporated in the piston accommodating part 41D of the right retainer 41. In this state, by fixing the right retainer 41 on the right partition wall 14C, the piston 46 can be caused to abut on the pressure ring 43 via a later-described thrust bearing 48.

An end surface of the inner-diameter projected part 46C of the piston 46 in the small-diameter cylindrical part 46B-side is formed as an annular pressing surface 46F pressing the pressure ring 43. On the other hand, an entire peripheral groove 46G in an annular shape is formed on an end surface of the inner-diameter projected part 46C at the opposite side to the pressing surface 46F (in the large-diameter cylindrical part 46A-side). An annular hydraulic chamber 47 is formed between the entire peripheral groove 46G and the end surface 41G of the piston accommodating part 41D in the right retainer 41 over an entire periphery thereof. Accordingly, when pressurized oil is supplied to the hydraulic chamber 47, the piston 46 axially moves to press the pressure ring 43.

An annular thrust bearing 48 is disposed between the pressing surface 46F of the piston 46 and the pressure ring 43. The thrust bearing 48 is disposed on an inner peripheral side of the small-diameter cylindrical part 46B of the piston 46 to be radially positioned. Accordingly, the piston 46 can press the pressure ring 43 via the thrust bearing 48, thus suppressing friction from being generated between the piston 46 and the pressure ring 43.

An oil passage 49 is formed in the right partition wall 14C of the differential body 14 and in the right retainer 41 to perform supply and discharge of pressurized oil (liquid pressure) to and from the hydraulic chamber 47. The oil passage 49 is composed of a partition wall-side oil passage 49A formed in the right partition wall 14C and a retainer-side oil passage 49B formed in the right retainer 41. A flow inlet of the partition wall-side oil passage 49A opens to the outer peripheral surface of the differential body 14. A flow outlet of the retainer-side oil passage 49B opens to the end surface 41G of the piston accommodating part 41D of the right retainer 41. A hydraulic source (unillustrated) is connected to the flow inlet of the partition wall-side oil passage 49A. The pressurized oil discharged from the hydraulic source is supplied via the partition wall-side oil passage 49A and the retainer-side oil passage 49B to the hydraulic chamber 47.

Thereby, the piston 46 axially presses the pressure ring 43 through the thrust bearing 48. Each of the rectangular projections 43D of the pressure ring 43 presses the pressing plate 40 to the non-rotating disc 39 against a spring force of each of the return springs 45. Therefore, the respective non-rotating discs 39 and the respective rotating discs 38 are made in frictional contact with each other between the second differential case 26 and the piston 46. Thereby, when a torque difference between the left axle shaft 19L and the right axle shaft 19R is equal to or less than the torque capacity of the clutch, the differential mechanism 20 becomes in the lock state (the differential lock state). As a result, the left and right side gears 34, 35 rotate together with the differential case 23 to transmit the torque to the left and right axle shafts 19L, 19R respectively.

On the other hand, when the supply of the pressurized oil to the hydraulic chamber 47 is stopped, the pressing plate and the piston 46 move in a direction away from the non-rotating discs 39 by the spring force of each of the return springs 45. As a result, the contact state between the respective non-rotating discs 39 and the respective rotating discs 38 is released and the right side gear 35 is made to be rotatable relative to the differential case 23 to make the differential function effective. As a result, the rotational force of the engine 7 is distributed to the left front wheel 5 and the right front wheel 5 in accordance with a difference in the frictional force between the left and right front wheels 5 and the road surface.

An air-bleeding passage 50 is formed in the right partition wall 14C of the differential body 14 and in the right retainer 41. The air-bleeding passage 50 is, at the time of incorporating the piston 46 to the piston accommodating part 41D of the right retainer 41, a passage for discharging air in the hydraulic chamber 47 to an exterior. As illustrated in FIG. 14, the air-bleeding passage 50 is configured of a partition wall-side passage 50A formed in the right partition wall 14C and a retainer-side passage 50B formed in the right retainer 41. One end 50A1 of the partition wall-side passage 50A opens to an end surface, which the collar part 41B of the right retainer 41 abuts on, of the right partition wall 14C. The other end 50A2 of the partition wall-side passage 50A opens to the outer peripheral surface of the differential body 14. One end 50B1 of the retainer-side passage 50B opens to the piston accommodating part 41D. The other end 50B2 of the retainer-side passage 50B opens to an axial end surface of the collar part 41B to be communicated with the one end 50A1 of the partition wall-side passage 50A. Thereby, when the piston 46 is installed in the piston accommodating part 41D of the right retainer 41, the air in the hydraulic chamber 47 is discharged through the retainer-side passage 50B and the partition wall-side passage 50A to an exterior. Accordingly, the piston 46 can smoothly be installed in the piston accommodating part 41D. It should be noted that after installing the piston 46, the other end 50A2 of the partition wall-side passage 50A is blocked by a sealing plug (unillustrated).

The left planetary gear reduction mechanism 51L is disposed in a reduction gear room 15B of the left axle tube 15L (refer to FIG. 2). The planetary gear reduction mechanism 51L is configured of the sun gear 36A formed integrally with the front end side of the left transmission shaft 36, a ring gear 52, a plurality of planet gears 53 and a carrier 54. The ring gear 52 is disposed on an inner peripheral side of the axle tube 15L (cylindrical part 15A). The plurality of planet gears 53 are engaged with the sun gear 36A and the ring gear 52. The carrier 54 rotatably supports each of the planet gears 53 and is spline-coupled to the axle shaft 19L.

Accordingly, the rotation of the left transmission shaft 36 is transmitted to the axle shaft 19L in a state of being reduced in speed by the planetary gear reduction mechanism 51L.

The right planetary gear reduction mechanism 51R is disposed in the reduction gear room 15B of the right axle tube 15R. The planetary gear reduction mechanism 51R is configured of, as similar to the left planetary gear reduction mechanism 51L, the sun gear 37A formed integrally with the front end side of the right transmission shaft 37, the ring gear 52, the plurality of planet gears 53 and the carrier 54. The carrier 54 is spline-coupled to the axle shaft 19L. Accordingly, the rotation of the right transmission shaft 37 is transmitted to the axle shaft 19R in a state of being reduced in speed by the planetary gear reduction mechanism 51R.

The left brake mechanism 55L is disposed in the left brake room 14F of the differential body 14. This brake mechanism. 55L is configured as a wet type multiple-brake mechanism, for example. The brake mechanism 55L includes a plurality of brake discs 57 spline-coupled via a hub 56 on an outer peripheral side of the left transmission shaft 36, a brake plate 58, and a brake piston 59. Each of the brake discs 57 rotates together with the left transmission shaft 36. The brake plate 58 is disposed to face the brake disc 57 and is held in a non-rotating state relative to the differential body 14. In addition, the brake piston 59 pushes the brake plate 58 against the brake disc 57 by the hydraulic force from an exterior. Thereby, the braking force is applied to the left transmission shaft 36.

The right brake mechanism 55R is disposed in the right brake room 14G of the differential body 14. The brake mechanism 55R is configured of, as similar to the left brake mechanism 55L, a plurality of brake discs 57 spline-coupled via a hub 56 on an outer peripheral side of the right transmission shaft 37, a brake plate 58, and a brake piston 59. In addition, the brake piston 59 pushes the brake plate 58 against the brake disc 57 by the hydraulic force from an exterior. Thereby, the braking force is applied to the right transmission shaft 37.

The front axle device 12 according to the present embodiment has the configuration as described above, and hereinafter, an explanation will be made of the operation of the front axle device 12 at the traveling of the wheel loader 1.

When an operator who has got in the cab 10 operates the engine 7, a rotational force of the engine 7 is transmitted to the input shaft 17 through the propeller shaft 9B of the transmission 9. The rotation of the input shaft 17 is transmitted from the drive pinion 17B to the ring gear 30 of the differential mechanism 20 to rotate the differential case 23 to which the ring gear 30 is attached.

Each of the shafts 32A of the spider 32 is tightly held between the recessed part 25H of the first differential case 25 and the recessed part 26E of the second differential case 26 configuring part of the differential case 23. Accordingly, the spider 32 rotates together with the differential case 23 in a state where the four pinion gears 33 are supported by each of the shafts 32A.

Here, in a state where the pressurized oil is not supplied to the hydraulic chamber 47 formed between the piston accommodating part 41D of the right retainer 41 and the piston 46 from the hydraulic source, the pressing plate 40 is urged in the direction away from the non-rotating discs 39 by the spring forces of the respective return springs 45. Thereby, the respective non-rotating discs 39 and the respective rotating discs 38 are held in the non-contact state with each other.

When the differential case 23 rotates together with the respective pinion gears 33, the left side gear 34 and the right side gear 35 engaged with the respective pinion gears 33 rotate. The rotation of the left transmission shaft 36 coupled to the left side gear 34 is transmitted to the axle shaft 19L in a state of being reduced in speed by the planetary gear reduction mechanism 51L. Similarly, the rotation of the right transmission shaft 37 coupled to the right side gear 35 is transmitted to the axle shaft 19R in a state of being reduced in speed by the planetary gear reduction mechanism 51R. As a result, the left and right front wheels 5 are driven and rotated simultaneously.

Here, in a case where a frictional force between the left front wheel 5 and the road surface is equal to that between the right front wheel 5 and the road surface at the straight-traveling of the wheel loader 1, the left and right side gears 34, 35 rotate together with the differential case 23. As a result, the rotational force of the engine 7 is transmitted to the left and right front wheels 5 on an equal basis, making it possible to cause the wheel loader 1 to travel straight.

In addition, in a case where the frictional force between the left front wheel 5 and the road surface differs from that between the right front wheel 5 and the road surface at the revolving traveling of the wheel loader 1, the left side gear 34 and right side gear 35 rotate in rotating speeds different from each other. As a result, the rotational force of the engine 7 is distributed to the left front wheel 5 and the right front wheel 5 in accordance with a difference in the frictional force between the left front wheel 5 and the road surface and between the right front wheel 5 and the road surface, and therefore, it is possible to cause the wheel loader 1 to travel for revolution.

On the other hand, when the wheel loader 1 travels in the sand, in the mud or the like, for example, there are some cases where a ground road surface state of the left front wheel 5 differs from a ground road surface state of the right front wheel 5. In this case, it is required to avoid one of the left and right front wheels 5 from possibly running idle due to the differential mechanism 20.

In this case, for example, a foot pedal, a manual switch and the like (none of them is illustrated) arranged in the cab are operated. Thereby, the pressurized oil from the hydraulic source is supplied through the partition wall-side oil passage 49A in the differential body 14 and the retainer-side oil passage 49B in the right retainer 41 to the hydraulic chamber 47.

Therefore, the piston 46 axially presses the pressure ring 43 through the thrust bearing 48. Each of the rectangular projections 43D of the pressure ring 43 presses the pressing plate 40 to the non-rotating disc 39 against the spring force of each of the return springs 45. Accordingly, the respective non-rotating discs 39 and the respective rotating discs 38 come in shaft frictional contact with each other between the second differential case 26 and the piston 46. Thereby, when the torque difference between the left axle shaft 19L and the right axle shaft 19R is equal to or less than the torque capacity of the clutch, the differential mechanism 20 becomes in the lock state (the differential lock state). As a result, the left and right side gears 34, 35 rotate together with the differential case 23 to transmit the torque to the left and right axle shafts 19L, 19R respectively. Accordingly, it is possible to avoid one of the left and right front wheels 5 from running idle, to cause the wheel loader 1 to travel.

Here, in a case of incorporating the differential mechanism 20 according to the present embodiment in the gear room 14E of the differential body 14, each of the pinion gears 33, the left and right side gears 34, 35, the rotating discs 38, the non-rotating discs 39 and the like are assembled within the differential case 23. In addition, the ring gear 30 is attached to the first differential case 25 and the pin 44 is attached in each of the screw holes 26J of the second differential case 26. In a state where the return spring 45 is arranged on the outer peripheral side of each of the pins 44, each of the pins 44 is inserted in the pin insert hole 27E of the third differential case 27. Further, each of the pins 44 is inserted in the pin through hole 43B of the pressure ring 43 and each of the rectangular projections 43D of the pressure ring 43 is inserted in each of the rectangular holes 27F of the third differential case 27. In this state, the stop ring 44B is attached to the projecting end of each of the pins 44.

In addition, the differential case 23 to which the pressure ring 43 is attached is inserted into the gear room 14E of the differential body 14. In this state, the left retainer 21 is inserted in the through hole 14D of the left partition wall 14B, and the collar part 21A is attached to the left partition wall 14B. Thereby, the first differential case 25 is held via the bearing 24 by the left retainer 21. On the other hand, the piston 46 is incorporated in the piston accommodating part 41D of the right retainer 41. In this state, the piston 46 and the cylindrical part 41A of the right retainer 41 are inserted in the through hole 14D formed in the right partition wall 14C of the differential body 14 and the collar part 41B is attached to the right partition wall 14C. As a result, the third differential case 27 is held via the bearing 24 by the right retainer 41. At this time, it is possible to cause the piston 46 to abut on the pressure ring 43 via the thrust bearing 48.

In this way, according to the present embodiment, the piston accommodating part 41D is formed in the right retainer 41 to be attached to the right partition wall 14C of the differential body 14, making it possible to assemble the piston 46 to the piston accommodating part 41D. Accordingly, it is not required to form the piston accommodating part on the surface of the right partition wall 14C in the gear room 14E-side. Thereby, it is possible to use the differential body 14 of the one-piece structure in which the left and right partition walls 14B, 14C defining the gear room 14E are integrally formed. Accordingly, as compared to a case where the piston accommodating part is formed on the partition wall of the differential body, it is possible to more simplify the configuration of the differential body 14. As a result, it is possible to simplify the configuration of the entire front axle device 12 to contribute to a reduction in the manufacture cost.

In addition, after inserting the differential case 23 into the gear room 14E of the differential body 14, the right retainer 41 to which the piston 46 is assembled can be attached to the right partition wall 14C. Thereby, it is possible to cause the piston 46 to abut on the pressure ring 43 through the thrust bearing 48. This result can enhance the workability at the time of assembling the piston 46 to the differential mechanism 20 accommodated in the differential body 14. In addition, it is not required to perform the assembly work of the piston 46 in the gear room 14E of the differential body 14. Therefore, the differential case 23 disposed in the gear room 14E can be structured to be large, increasing the number of the rotating discs 38 and the non-rotating discs 39, for example.

In this way, according to the present embodiment, the front axle device 12 has the differential mechanism 20 transmitting the rotational force of the engine 7 to the left and right axle shafts 19L, 19R. The differential mechanism 20 is provided with the differential case 23 that is rotatably supported through the bearing 24 by the left and right retainers 21, 41 attached respectively to the through holes 14D of the left and right partition walls 14B, 14C and rotates by the engine 7, the plurality of pinion gears 33 that are arranged in the differential case 23 and rotate together with the differential case 23, the left and right side gears 34, 35 that are arranged in the differential case 23 and engaged with the respective pinion gears 33, and the left and right transmission shafts 36, 37 that are connected to the respective side gears 34, 35 and transmit the rotation of the differential case 23 to the left and right axle shafts 19L, 19R.

In addition, the differential case 23 is provided therein with the plurality of rotating discs 38 spline-coupled to the outer peripheral side of the right side gear 35 and the plurality of non-rotating discs 39 that are arranged between the respective rotating discs 38 and are non-rotatable relative to the differential case 23 and movable in the left-right direction, the pressure ring 43 is disposed between the right retainer 41 positioned in the right side gear 35-side and the non-rotating discs 39 to press the non-rotating discs 39 toward the rotating discs 38, the piston accommodating part 41D is disposed in the right retainer 41 in a position facing the pressure ring 43 in the left-right direction, and the piston 46 is disposed in the piston accommodating part 41D, the piston 46 being displaced by the liquid pressure to press the non-rotating discs 39 via the pressure ring 43 against the rotating discs 38 and connect the left and right transmission shafts 36, 37.

According to this configuration, since the piston 46 can be assembled to the piston accommodating part 41D formed in the right retainer 41, it is not required to form the piston accommodating part on the surface of the right partition wall 14C in the gear room 14E-side. Thereby, it is possible to use the differential body 14 of the one-piece structure in which the left and right partition walls 14B, 14C defining the gear room 14E are integrally formed. Accordingly, as compared to a case of forming the piston accommodating part in the partition wall of the differential body, the configuration of the differential body 14 can be more simplified.

According to the present embodiment, the hydraulic chamber 47 to which the pressurized oil for pressing the piston 46 is supplied is formed between the piston 46 and the piston accommodating part 41D of the right retainer 41, and the oil passage 49 for connection between the hydraulic source and the hydraulic chamber 47 is formed in the right partition wall 14C of the differential body 14 and in the right retainer 41. According to this configuration, the pressurized oil from the hydraulic source is supplied through the oil passage 49 formed in the right partition wall 14C and in the right retainer 41 to the hydraulic chamber 47. Accordingly, it is not required to connect a hydraulic line composed of a different component from the right retainer 41 to the hydraulic chamber 47, making it possible to simplify the configuration of the differential mechanism 20.

According to the present embodiment, the differential case 23 includes the first differential case 25 that is rotatably supported by the left retainer 21 and in which the ring gear 30 is disposed on the outer peripheral side and the left side gear 34 is disposed on the inner peripheral side, the second differential case 26 that is attached to the first differential case 25 and in which the right side gear 35 is disposed on the inner peripheral side and the third differential case 27 that is attached to the second differential case 26 to be positioned at the opposite side to the first differential case 25 in the left-right direction and is rotatably supported on the right retainer 41, and the respective rotating discs 38 and the respective non-rotating discs 39 are arranged between the inner peripheral side of the second differential case 26 and the shaft spline part 35B of the right side gear 35, and the piston 46 can press the non-rotating discs 39 via the pressure ring 43 inserted in the third differential case 27.

According to the present embodiment, the pressing plate 40 is disposed between the non-rotating disc 39 and the pressure ring 43 to press the non-rotating discs 39 when the piston 46 operates to move the pressure ring 43 toward the non-rotating disc 39, the pin 44 is disposed between the second differential case 26 and the pressure ring 43 to be inserted in the third differential case 27 and in the pressing plate 40, and the return spring 45 is disposed between the second differential case 26 and the pressing plate 40, the return spring 45 being located on the outer peripheral side of the pin 44 to urge the pressing plate 40 toward the piston 46-side.

According to this configuration, when the supply of the pressurized oil to the hydraulic chamber 47 is stopped, the pressing plate 40 and the piston 46 move in a direction away from the non-rotating discs 39 by the spring force of the return spring 45. As a result, the contact state between the respective non-rotating discs 39 and the respective rotating discs 38 is released and the right side gear 35 is made rotatable relative to the differential case 23 to make the differential function effective. As a result, the rotational force of the engine 7 can be distributed to the left front wheel 5 and the right front wheel 5 in accordance with the difference in frictional force between the left front wheel 5 and the road surface and between the right front wheel 5 and the road surface.

It should be noted that in the present embodiment, the wheel loader 1 is exemplified as the vehicle to which the rear axle device 11 and the front axle device 12 are applied. The present invention is, however, not limited thereto, but, for example, may be applied widely to other wheel type construction machines such as a wheel type excavator.

DESCRIPTION OF REFERENCE NUMERALS

1: Wheel loader
4: Rear wheel
5: Front wheel
7: Engine (Drive source)
11: Rear axle device
12: Front axle device
14: Differential body
14B: Left partition wall
14C: Right partition wall
14D: Through hole
15L, 15R: Axle tube
19L, 19R: Axle shaft
20: Differential mechanism
21: Left retainer (Other retainer)
23: Differential case
25: First differential case
26: Second differential case
27: Third differential case
30: Ring gear
33: Pinion gear
34: Left side gear
35: Right side gear (One side gear)
36: Left transmission shaft
37: Right transmission shaft
38: Rotating disc
39: Non-rotating disc
40: Pressing plate
41: Right retainer (One retainer)
41D: Piston accommodating part
43: Pressure ring
44: Pin
45: Return spring
46: Piston
47: Hydraulic chamber
49: Oil passage

The invention claimed is:

1. A vehicle axle device comprising:
left and right axle shafts to which left and right wheels are respectively attached;
a hollow differential body that is disposed between left and right axle tubes accommodating the left and right axle shafts and in both sides of a left-right direction of which partition walls each having a through hole penetrating therethrough in the left-right direction are respectively arranged; and
a differential mechanism that is disposed between the left and right partition walls of the differential body to transmit a rotational force of a drive source to the left and right axle shafts, wherein the differential mechanism includes:
a differential case that is rotatably supported through bearings on left and right retainers respectively attached in the through holes of the left and right partition walls and is rotated by the drive source;
a plurality of pinion gears that are arranged in the differential case and rotate together with the differential case;
left and right side gears that are arranged in the differential case and are respectively engaged with the respective pinion gears; and
left and right transmission shafts that are connected to the respective side gears to transmit the rotation of the differential case to the left and right axle shafts, characterized in that,
the differential case is therein provided with:
a plurality of rotating discs that are spline-coupled to an outer peripheral side of one side gear of the left and right side gears; and
a plurality of non-rotating discs that are arranged between the plurality of rotating discs and are non-rotatable relative to the differential case and movable in the left-right direction,
a pressure ring is disposed between one retainer of the left and right retainers positioned in the one side gear-side and the non-rotating disc to press the non-rotating disc against the rotating disc,
a piston accommodating part is disposed in the one retainer in a position facing the pressure ring in the left-right direction, and
a piston is disposed in the piston accommodating part of the one retainer, the piston being displaced by hydraulic pressure to press the non-rotating disc via the pressure ring against the rotating disc and couple the left and right transmission shafts,
wherein the differential case includes:
a first differential case that is rotatably supported by the other retainer of the left and right retainers and is provided with a ring gear on an outer peripheral side thereof, to which a rotational force by the drive source is transmitted, and with the other side gear of the left and right side gears on an inner peripheral side thereof;
a second differential case that is attached to the first differential case and is provided with the one side gear on an inner peripheral side thereof; and
a third differential case that is attached to the second differential case to be positioned at the opposite side to the first differential case in the left-right direction and is rotatably supported on the one retainer, the respective rotating discs and the respective non-rotating discs are arranged between the inner peripheral side of the second differential case and the one side gear, and the piston presses the non-rotating discs via the pressure ring inserted in the third differential case.

2. The vehicle axle device according to claim 1, wherein a hydraulic chamber to which pressurized oil for pressing the piston is supplied is formed between the piston and the piston accommodating part of the one retainer, and an oil passage for connection between the hydraulic source and the hydraulic chamber is formed in the one partition wall and in the one retainer.

3. The vehicle axle device according to claim 1, wherein a pressing plate is disposed between the non-rotating disc and the pressure ring to press the non-rotating discs when the piston operates to move the pressure ring toward the non-rotating discs, a pin is disposed between the second differential case and the pressure ring to be inserted in the third differential case and in the pressing plate, and a return spring is disposed between the second differential case and the pressing plate, the return spring being disposed on an outer peripheral side of the pin to urge the pressing plate toward the piston side.

\* \* \* \* \*